INVENTORS
LEO MARCOUX
JOHN KOURTESIS
BY John C. Haug
ATTORNEY

INVENTORS
LEO MARCOUX
JOHN KOURTESIS
BY John C. Haug
ATTORNEY 3,676,211

CONTACT SYSTEM FOR ELECTRICALLY CONDUCTIVE CERAMIC-LIKE MATERIAL

John G. Kourtesis, East Providence, R.I., and Leo Marcoux, Rehoboth, Mass., assignors to Texas Instruments Incorporated, Dallas, Tex.

Filed Jan. 2, 1970, Ser. No. 340
Int. Cl. H01l 1/14
U.S. Cl. 117—212 13 Claims

ABSTRACT OF THE DISCLOSURE

An improved contact system is provided for ceramic or ceramic-like material. Pills of electrically conductive or semiconductive ceramic material such as a barium titanate doped with a rare earth are placed in a holder so that the outer periphery of the pill is masked and flame sprayed with a metal which gives a good physical bond and an ohmic contact having low electrical resistance. Although several metals can be employed for this coating, aluminum is preferred. The pill is preheated to mitigate thermal shock problems. When aluminum is employed, preheating of the pill is also found to significantly enhance the bond strength between the ceramic and the aluminum. The end use of the pill affects the choice of the metallic layer applied to the ceramic. For certain applications, for instance, one layer may suffice, such as when pressure leads are employed. For such applications an ohmic contact having a good physical bond is all that is required; however, in many other applications, it is desired to solder leads to the contact layer. In such cases, the ceramic pill must have a first coating of aluminum to provide the necessary physical bond; however, since aluminum cannot be soldered, another layer of material is required. This second layer of solderable material, such as copper, is applied, preferably by flame spraying onto the unmasked surface of the pills. The pills are removed and the periphery is abrasively cleaned to ensure removal of any conductive material which may have gotten beyond the mask. The pills are then placed between the ends of a generally U-shaped springy lead so that the ends are biased into engagement with the opposite faces of the pill. The pills are passed through a foam flux, then into a solder bath. For many applications, when electrical insulation is not required, the pills are then ready for use upon cutting off of the bight portion of the U-shaped lead. Where electrical insulation is required, the pills are coated with a conventional encapsulating material. In either case, the leads may be deformed to provide stops useful to limit insertion of the switch into its mount and finally, if the bight portion of the lead is still attached, it is cut off.

This invention relates to an improved contact system for ceramic material. More particularly, it relates to the attachment of contacts to an electrically conductive or semiconductive ceramic material for use as heater elements, thermistors, current limiters or switches and the like. The use of conductive or semiconductive ceramic has become widespread in the electrical industry. Examples of this material include doped barium-titanate, for example, $Ba_{.997}La_{.003}TiO_3$, doper barium strontium titanate ($BaSrTiO_3$) and doped barium lead titanate ($BaPbTiO_3$). This material has been used, for instance, to make thermistors which exhibit certain resistance-temperature relationships such as self-limiting heating elements and as current limiters. A long-standing problem associated with the fabrication of these devices, however, has been the provision of means to make electrical contact which means are inexpensive, yet have a physically strong bond and exhibit a good ohmic connection and having low electrical resistance. Various approaches have been used in the past, such as electroless nickel plating, vacuum deposition, flame spraying of an alloy, etc. However, each of the prior art methods have had disadvantages associated with them. It was found, for instance, that electroless plating caused deterioration of the resistance characteristic of positive temperature coefficient (PTC) of resistance material at both the high and low end of the PTC curve, particularly so at the high end. Apparently, the various chemicals involved in the plating are absorbed into the interstices of the ceramic and in some way deleteriously affect the PTC curve. Further deleterious effects are caused by baking at elevated temperatures over an extended period of time. Vacuum deposition is a high-cost process and is relatively slow as well as being limited in capacity.

Flame spraying of a contact alloy, as exemplified by U.S. Pat. 3,023,390 to Moratis et al., while resulting in an acceptable ohmic contact, is prohibitively expensive because of the high silver content of the alloy and results in a contact having an insufficient bond between the alloy and the ceramic.

It is therefore an object of the invention to provide an electrically conductive or semiconductive ceramic body with improved electrical contacts. Another object is the provision of an inexpensive solid state switch, said switch being composed of semiconducting ceramic having contacts with a strong physical bond between the contact layer and the ceramic, yet having low electrical resistance. Yet another object is the provision of a contact system which is non-rectifying. Another object of the invention is the provision of a contact system conducive to the attachment of leads by conventional soldering techniques.

Further objects and advantages of the invention will become apparent from the following detailed specification, appended claims and attached drawings.

The invention accordingly comprises the elements and combinations of elements, steps and sequence of steps, features of construction and manipulation, and arrangements of parts, all of which will be exemplified in the structures and methods hereinafter described, and the scope of the application of which will be indicated in the following claims.

Referring to the accompanying drawings, which illustrate several of the various possible embodiments of the invention, and in which like reference numerals indicate like parts throughout the several views.

Figure 2:
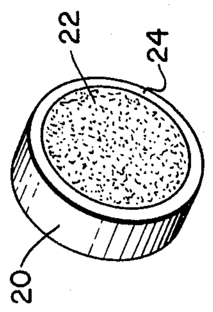
FIG. 2 is a pictorial view of a pill or element of the ceramic material showing a masked coating 22 on a face thereof.

Dimensions of certain of the parts as shown in the drawings may have been modified and/or exaggerated for the purposes of clarity of illustration.

As mentioned above in reference to prior art methods of attaching conductive material to electrically conductive or semiconductive ceramic, there has been an inability to provide a contact which had all the necessary characteristics, such as high physical bond strength, a contact which would be conducive to or permit soldering thereto of electrical leads, a contact which formed a good ohmic contact, that is, had low electrical resistance and a contact which is non rectifying. If subjected to excessive heat for an extended period of time, the resistance characteristic of the material is deleteriously affected, such as by losing the PTC (positive temperature coefficient of resistance) effect or NTC (negative temperature coefficient of resistance), yet many systems which did not employ harmful heat levels resulted in a contact with poor bond strength, one, for instance, in which the contact could be peeled off the ceramic. As mentioned above, electroless nickel plating has been used, but with limited effectiveness due to its propensity for deterioration of the resistance characteristics. Flame spraying, in accordance with the Moratis et al. patent referred to supra, does not provide sufficient contact strength and is very expensive because of the high silver content. Further, thermal shock with concomitant cracking and spallings (laminar cracking parallel to the surface layer) has been a problem associated with flame spraying due to the low thermal conductivity of ceramic type material.

On the other hand, the flame spraying approach is attractive because potentially it can be a relatively inexpensive, continuous process and if the cost of the materials were reduced, the thermal shock problems overcome and an improved bond achieved, it would overcome the prior art difficulties while retaining its inherent advantages. These problems have been solved by the instant invention as will become apparent in the following detailed description of the process.

Figure 1:
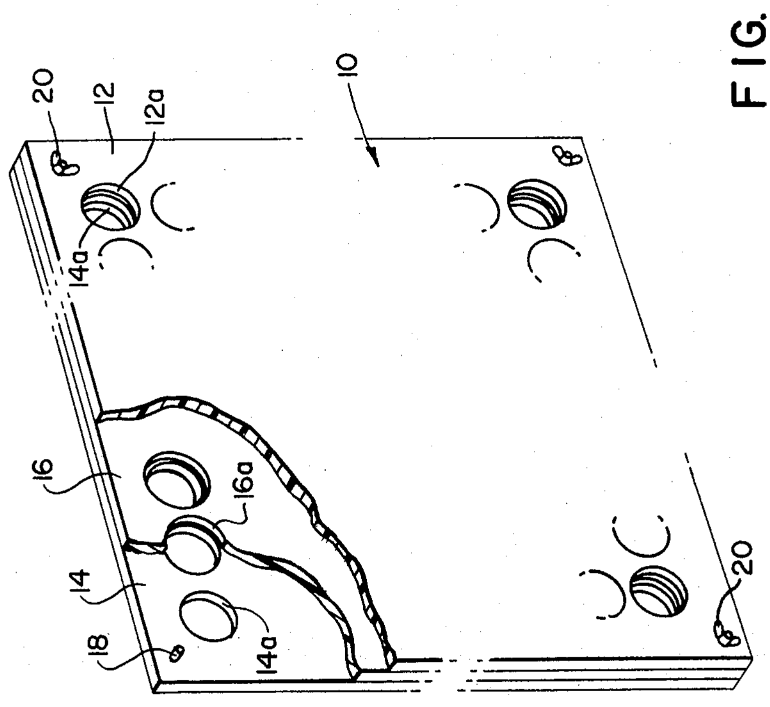
FIG. 1 is a pictorial view of a holder partly broken away, used in processing the electrically conductive or semiconductive ceramic material in accordance with the invention.
Figure 3:
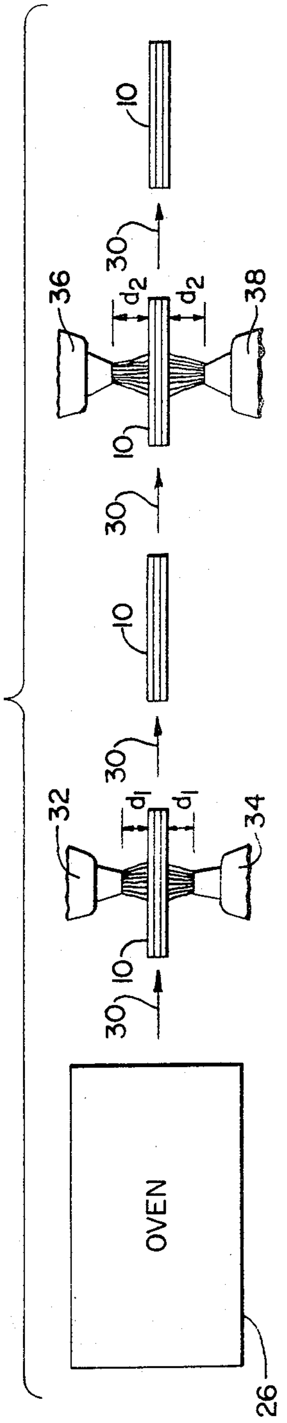
FIG. 3 is a schematic showing of the process for applying the contact layers to the ceramic material.
Figure 5:
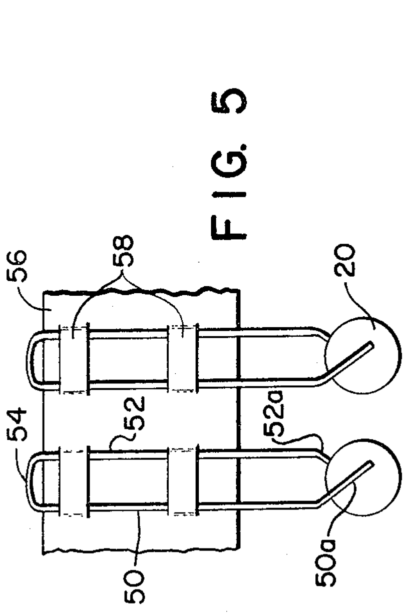
FIG. 5 shows a plurality of ceramic pills spring held by leads which in turn are held in a support means.

As shown in FIG. 1, a holder 10 is provided comprising parallel plates 12 and 14 sandwiching therebetween plate 16. Conventional threaded pins 18 and nuts 20 are provided to fix the plates together. A plurality of holes **12*a* and 14*a* are provided in the outside plates, the diameter of which is slightly smaller than the diameter of the ceramic pill. In alignment with holes 12*a* and 14*a* are holes 16*a* in plate 16. Holes 16*a* receive pills 20, one of which is shown in FIG. 2. As seen in FIG. 2, a small annular portion 24 on either face of the pill 20 is free of coating material. This is, portion 24 is masked from coating 22 by virtue of the plates 12 and 14. Holders 10 are placed in oven 26 so that the pills are preheated. It was found that this is a key step since preheating minimizes thermal shock problems referred to above. The preheating is kept below levels which would deleteriously affect the resistance characteristics of the semiconducting ceramic material. It was found that a range of 450°–525° F. is suitable with an optimum temperature of approximately 500° F. Holders 10 are then passed in the direction of arrows 30 between flame spray guns 32, 34 which project particles of metal in a high temperature flame with an accelerating air blast. A conductive material is fed into guns 32, 34 such as commercially pure aluminum wire. Guns 32, 34 could be directly opposite one another as shown, or one could precede the other. It was found that an optimum distance, $d_1$, between the guns and plates 10 is 3.5 inches plus or minus 0.5 inch. After holder 10 passes beyond guns 32, 34, pills 20 are as shown in FIG. 2. The aluminum makes an excellent physical bond with the ceramic material, as well as resulting in a good ohmic contact having an electrical resistance of negligible amounts. For some applications, the pill 20 with just a single layer of metal coated thereon, is ready for use. For instance, co-assigned U.S. application Ser. No. 787,717 of Robert F. Blaha, which issued on Mar. 2, 1971 as U.S. Pat. No. 3,568,013, a pill 52 is employed formed of semiconductive ceramic material having a positive temperature coefficient (PTC) of resistance. Such material could be formed of a ceramic titanate such as lanthanum doped barium-titanate, and as disclosed in the application, the pill is cylindrical in shape and is metallized on opposite faces with layers 54, 56 by plating, firing or ultrasonic soldering. Pill 20 with aluminum layer 22 flame sprayed thereon can be used in the switch disclosed in the application referred to which employs pressure contacts 42, 44** or variants thereof.

Figure 4:
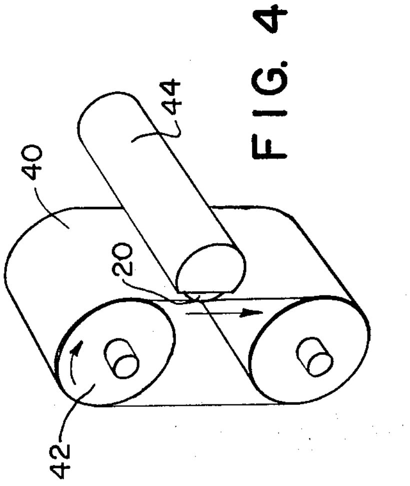
FIG. 4 is a schematic showing of means to clean the outer periphery of the ceramic material.
Figure 6:
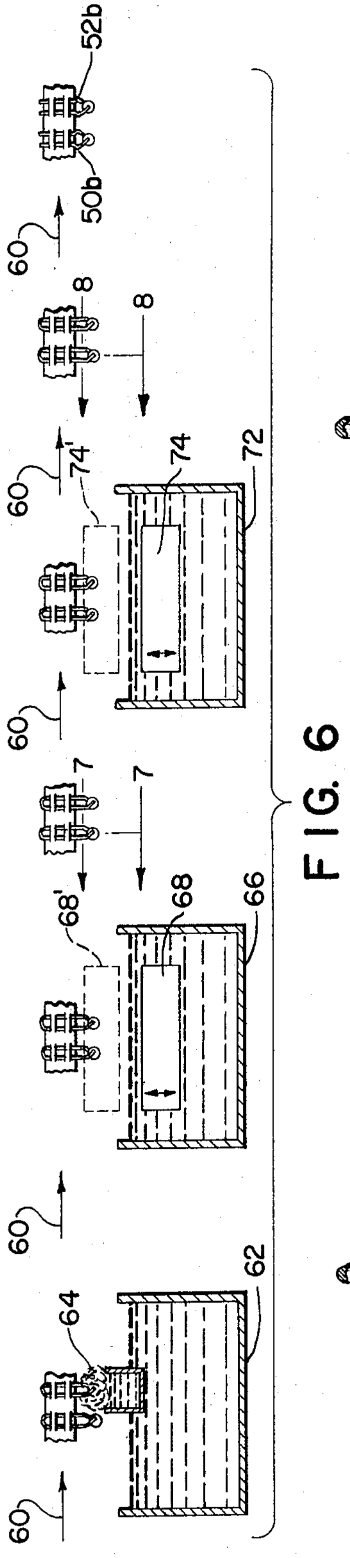
FIG. 6 is a schematic showing of further processing steps to the ceramic material.
Figure 8:
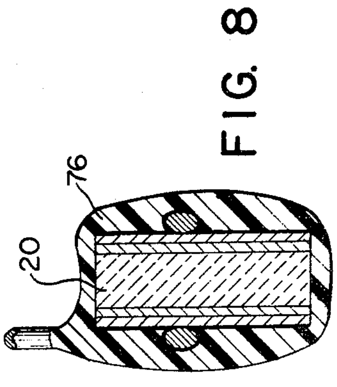
FIG. 8 is a cross-section of a ceramic pill after the pill has been coated with an electrically insulative encapsulation.
Figure 7:
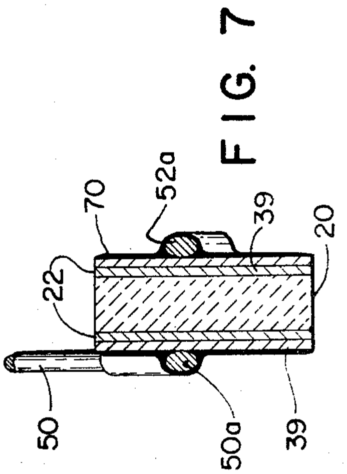
FIG. 7 is a cross-section of a ceramic pill after conductive leads have been soldered thereto.

However, in many other applications it is desirable to physicially affix leads to the contact layers. Contact layer 22 of aluminum is not suitable for conventional soldering techniques. Therefore, a second layer is required. This conveniently can be accomplished by guns 36, 38 wherein suitable material such as commercially pure copper wire is fed into the guns. The problem of effecting a bond to the aluminum is much less critical than of attaching the first contact layer to the ceramic, thus it is found that the guns can be spaced further from the substrate to minimize thermal shock problems and thus preheating is not required. Guns 36, 38 are spaced from plate 10 an optimum distance $d_2$ found to be 5.5 inches plus or minus 0.5 inch. Pills 20 may then be abrasively cleaned to ensure that there are no conductive particules on the outer periphery of the pill 20. Thus, as shown in FIG. 4, abrasive means such as belt sander 40 driven in the direction of arrow 42, is placed in contact with a plurality of pills 20 held in holder 44 in such a manner that the pills are caused to rotate by the belt 40 to clean the entire periphery thereof. Electrical lead wire material having good spring characteristics such as a copper cored steel wire bent in a generally U-shape having ends 50 and 52 joined by bight portion 54, are biased together to hold a pill placed therebetween. Free ends **50*a* and 52*a* are slightly bent in order to pass closer to the center of mass of the pill and permit a greater length of attachment of the wire to the contact layer. Leads 50, 52 are then held in a continuous support 56 of any suitable material such as a cardboard layer by means of cutout straps 58. Holder 56 advances along a path as shown by arrows 60 so that pills 20 pass a first flux station 62 in which the flux is foamed as at 64 in a conventional manner. Holder 56 is caused to move intermittently so that at station 66 a trough 68 moves from the solid line position to the dotted line position 68' and carries therewith a bath of solder immersing the entire pill. It will be noted that the solder remains in attachment only with the layer 22. FIG. 7 shows pill 20 with the first contact layer 22 on opposite faces thereof, the second contact layer 39 on the outside surfaces of layer 22, the free end portions 50*a* and 52*a* of leads 50 and 52 and solder 70 covering the end portion of the leads and outer contact layer. For applications where electrical insulation is not required, the pill is useful as shown in FIG. 7, for instance, as a solid state switch when the ceramic material has a PTC characteristic. In certain cases, however, it is desirable to encapsulate the pill 20 which can be done by causing holder 56 to continue along path 60 through station 72 which holds a bath of suitable encapsulating material such as a thermosetting phenolic resin. Trough 74 is movable from the solid line position to the dotted position 74' immersing the pill. FIG. 8 shows a cross section of pill 20 so encapsulated with coating 76. When the pill is to be inserted in a base such as a circuit board, it is often desirable to provide means to limit the amount of insertion. This may be done by bending leads 50, 52 as shown at 50*b* and 52*b*. Lastly, bight portion 54 of leads 50, 52** is servered.

A specific example of pills provided with contact layers in accordance with the invention is as follows: Cylindrically shaped pills 0.100 inch in thickness and 0.500 inch in diameter were inserted into holder 10. Holder 10 was placed in oven 26 and preheated until a steady state condition of 500° F. was achieved. Commercially pure aluminum wire 0.057 inch in diameter (No. 15 AWG) was fed at a rate of 0.6 inch per second to guns 32, 34. Twenty c.f.m. of oxygen, 20 c.f.m. of acetylene, and 44 c.f.m. of air were used in guns 32, 34 with a relative movement of holder 10 and guns 32, 34 of 2.4 inches per second and $d_1$ equaled 3.5 inches. This resulted in a coating thickness 22 which varied between approximately 0.001 and 0.003 inch. The same size wire, 0.057 inch diameter, of commercially pure copper was fed to guns 36, 38 at 0.6 of an inch per second with 20 c.f.m. of oxygen, 20 c.f.m. of acetylene and 44 c.f.m. of air, with $d_2$ equal to 5.5 inches and relative movement of holder 10 and guns 36, 38 of 2.0 inches per second. This also resulted in a thickness which varied between approximately 0.001 and 0.003 inch. Pills 28 were then placed between leads 50, 52 and held in support 56. The pills were passed through a foam flux of a conventional organic resin type at station 62, then at station 66 dipped into solder of 60 percent tin and 40 percent lead. The solder, having a melting temperature of 360° F., was kept slightly above that temperature. Some of the pills were then dipped in encapsulating bath of a conventional thermosetting phenolic resin. When pressure contacts were to be employed, as in the switch disclosed in the Pat. No. 3,568,013 referenced earlier, several materials can be used which give sufficient bond strength with low electrical resistance. Materials found to be acceptable include tin, zinc, 50 percent lead and 50 percent tin solder, babbitt, molybdenum and certain alloys of silver, copper, zinc and cadmium. However, to permit use of flux to facilitate soldering when it is desired to solder leads to the ceramic pills, the low melting materials (tin, zinc, babbitt, solder), are not suitable. These contact materials tend to dissolve in the molten solder and de-wet the pill surface resulting in inadequate bond strength. The bond strength of molybdenum and the alloys, as mentioned previously, is unsatisfactory. Aluminum cannot easily be soldered but does give an excellent contact bond of low electrical resistance of a non-rectifying nature and is relatively inexpensive. For instance, the cost of the alloy referenced above is as much as seventeen times more expensive than the aluminum with a second, solderable coating thereon. This second, solderable coating can be any conventional solderable material such as copper, silver and the like, and can be applied in any conventional manner including vacuum deposition, electro-plating, etc. Flame spraying the second contact layer works out very well since the pills are already prepared for this process and since it is easier to effect a bond between the metal layers; the location of the flame spraying gun can be at a greater distance than used for the first aluminum layer. This, of course, mitigates thermal shock problems. It has also been found that copper provides an excellent contact material even though it is unsatisfactory when substituted for the aluminum layer since it is found to exhibit a rectifying characteristic when so used. Copper is easily solderable with mild fluxes, loses essentially no coating in the soldering operation and is of relatively low cost.

A surprising advantage is obtained when using aluminum as the first contact layer in that the preheating step is found to markedly improve the bond strength between the aluminum and the ceramic. This phenomenon does not occur with any of the other materials mentioned. Further, the improved bond strength is greater than for any other known material.

Aluminum sheathed, copper core wire was flame sprayed in an attempt to achieve in one step the aluminum, copper contact system. The resulting coating, using a diameter ratio of 15 percent aluminum, 85 percent copper wire, was unsatisfactory in that it had the physical and electrical characteristics of a pure aluminum layer and could not be soldered.

It will be understood that it is within the purview of the invention to employ powdered material in the spray guns rather than wire if so desired. Wire is preferred since it is substantially less expensive and easier to handle in the spraying operation. In view of the above, it will be seen that the objects of the invention have been achieved by means of the invention.

In view of the above, it will be seen that the several objects of the invention are achieved and other advantageous results attained.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

As many changes could be made in the above constructions without departing from the scope of the invention, it is intended that all matter contained in the above description or shown in the accompanying drawings, shall be interpreted as illustrative and not in a limiting sense, and it is also intended that the appended claims shall cover all such equivalent variations as come within the true spirit and scope of the invention.

We claim:

1. A process for forming an electrical contact on a semiconductive ceramic element which is firmly adherent thereto comprising the steps of supporting an element of semiconductive ceramic material, preheating the element to a temperature between 450 and 525° F., and flame spraying the element with a coating of aluminum.

2. A process according to claim 1 in which the preheat temperature is 500° F.

3. A process according to claim 1 in which the spraying is effected through a distance of approximately 3.5 inches from the element and with relative movement between the element and the source of the flame spraying of approximately 2.4 inches per second.

4. A process according to claim 1 further including the step of coating the aluminum layer with a solderable material.

5. A process according to claim 4 in which the solderable material is a commercially pure copper which is flame sprayed onto the aluminum layer from a distance of approximately 5.5 inches with a relative movement between the element and the source of the flame spraying of approximately 2.0 inches per second.

6. A process according to claim 1 in which the thickness of the coating varies between approximately .001 to .003 inch.

7. A process according to claim 5 in which the thickness of the copper varies between approximately .001 to .003 inch.

8. A process according to claim 1 including the step prior to coating of masking a portion of the element surface to confine the coating to a preselected surface area.

9. A process according to claim 8 further including the step of abrasively cleaning the portion of the element subsequent to coating.

10. A process for forming an ohmic contact on a semiconductive ceramic element which is firmly adherent thereto comprising the steps of supporting an element of semiconductive ceramic material, preheating the element to a temperature between 450 and 525° F., and flame spraying the element with a coating of commercially pure aluminum.

11. A semiconductive ceramic element having on a portion of the surface thereof a layer of electrically conductive aluminum which forms an ohmic electrical contact therewith and is firmly adherent thereto by preheating the element to a temperature between 450 and 525° F. prior to applying the layer to the surface by flame spraying, the layer having a thickness which varies on the element between approximately .001 and .003 inch.

12. A semiconductive ceramic element according to claim 11 in which the ceramic is a barium titanate doped with a rare earth and has a positive temperature coefficient (PTC) of resistance.

13. A semiconductive ceramic element having on a portion of the surface thereof a layer of commercially pure aluminum having a thickness which varies on the element between approximately .001 and .003 inch which forms an ohmic electrical contact therewith and is firmly adherent thereto by preheating the element to a temperature between 450 and 525° F. prior to applying the layer to the surface by flame spraying.

References Cited

UNITED STATES PATENTS

| | | | |
|---|---|---|---|
| 3,023,390 | 2/1962 | Moratis et al. | 117—217 X |
| 3,256,472 | 6/1966 | Centurioni | 317—258 X |

| | | | |
|---|---|---|---|
| 3,195,217 | 7/1965 | John | 117—93.1 |
| 3,020,182 | 2/1962 | Daniels | 117—217 |
| 3,243,313 | 3/1966 | Aves, Jr. | 117—105.2 X |
| 3,197,335 | 7/1965 | Lestynski | 117—105.5 X |
| 2,922,730 | 1/1960 | Feldman | 317—238 X |
| 3,299,332 | 1/1967 | Saburi | 317—258 X |

RALPH S. KENDALL, Primary Examiner

U.S. Cl. X.R.

29—589; 117—213, 217, 227, 105.2